(12) United States Patent
Logalbo et al.

(10) Patent No.: US 6,928,065 B2
(45) Date of Patent: Aug. 9, 2005

(54) METHODS OF ADDRESSING AND SIGNALING A PLURALITY OF SUBSCRIBER UNITS IN A SINGLE SLOT

(75) Inventors: Robert D. Logalbo, Hoffman Estates, IL (US); Alan P. Conrad, St. Charles, IL (US); Darrell J. Stogner, Plantation, FL (US); Jeffrey S. Anderson, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/166,838

(22) Filed: Jun. 11, 2002

(65) Prior Publication Data

US 2003/0227898 A1 Dec. 11, 2003

(51) Int. Cl.[7] .......... H04B 7/212; H04B 14/04; H04L 12/28; H04Q 7/00
(52) U.S. Cl. .......... 370/337; 370/410; 370/314; 370/442; 375/242
(58) Field of Search .......... 370/432, 437, 370/442, 447, 458, 461, 470, 471, 472, 337, 347, 336, 443, 280, 277, 278, 294; 375/222, 261, 298, 335

(56) References Cited

U.S. PATENT DOCUMENTS

| | | | | |
|---|---|---|---|---|
| 4,736,371 A | * | 4/1988 | Tejima et al. | 370/432 |
| 5,303,234 A | * | 4/1994 | Kou | 370/442 |
| 5,883,581 A | * | 3/1999 | Dorenbosch et al. | 340/825.44 |
| 5,912,920 A | * | 6/1999 | Maarchok et al. | 375/219 |
| 5,953,344 A | | 9/1999 | Dail et al. | |
| 5,970,095 A | * | 10/1999 | Hauris et al. | 370/437 |
| 6,151,329 A | * | 11/2000 | Berrada et al. | 370/447 |
| 6,285,681 B1 | * | 9/2001 | Kolze et al. | 370/442 |
| RE37,494 E | | 1/2002 | Cantoni et al. | |
| 6,381,289 B1 | * | 4/2002 | Dutta | 375/335 |
| 6,388,997 B1 | | 5/2002 | Scott | |
| 6,463,042 B1 | * | 10/2002 | Paatelma | 370/318 |
| 6,463,073 B1 | * | 10/2002 | Bontu et al. | 370/442 |
| 6,507,587 B1 | * | 1/2003 | Bahl | 370/443 |
| 6,622,278 B1 | * | 9/2003 | Morgan et al. | 714/758 |
| 6,804,211 B1 | * | 10/2004 | Klein et al. | 370/329 |
| 6,810,236 B2 | * | 10/2004 | Terry et al. | 455/67.11 |

FOREIGN PATENT DOCUMENTS

GB 2 309 362 A 1/1996

* cited by examiner

*Primary Examiner*—Hanh Nguyen
(74) *Attorney, Agent, or Firm*—Terri S. Hughes

(57) ABSTRACT

In a system having at least a first slot (104) and a first header (106), at least one field is provided in the first header (106). The first slot (104) is configured into at least a first segment and a second segment or into at least a signaling communications path comprising a plurality of messages, based on a value associated with at least a portion of the at last one field associated with the first header. The first segment/message is address to a first subscriber unit and the second segment/message is addressed to a second subscriber unit.

30 Claims, 7 Drawing Sheets

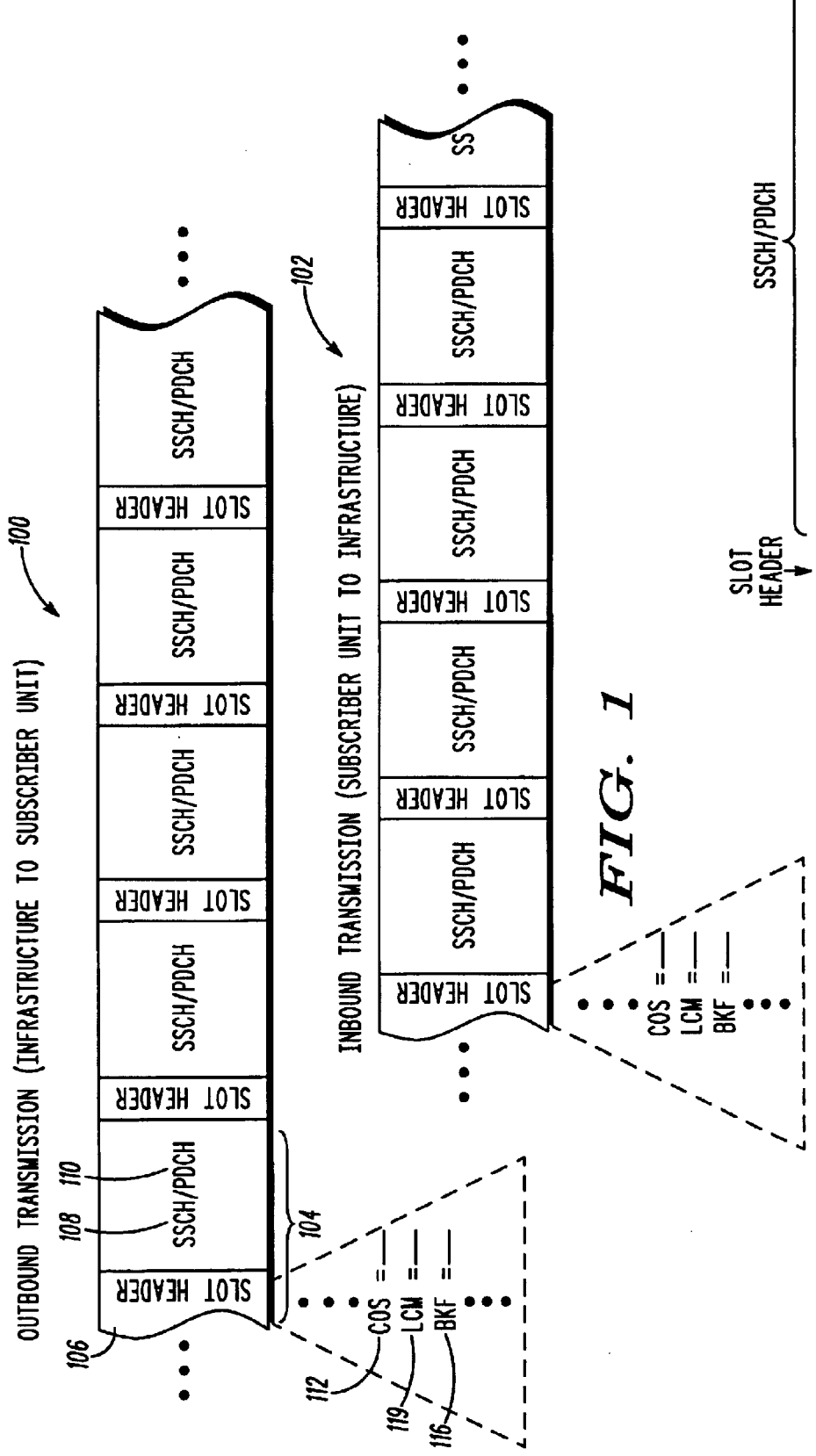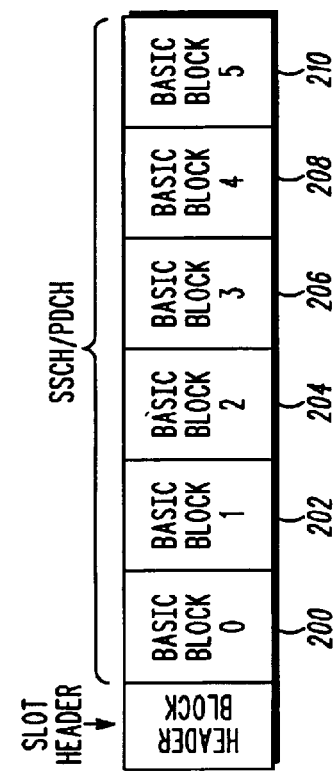
FIG. 1
FIG. 2

FIG. 3A

| BKF VALUE | BASIC BLOCK PACKING STRUCTURE | | | | | | | |
|---|---|---|---|---|---|---|---|---|
| %000 | 4-QAM 1/2 RATE | | | | | | | |
| %001 | 16-QAM 1/2 RATE | | 16-QAM 1/2 RATE | | 16-QAM 1/2 RATE | | 16-QAM 1/2 RATE | |
| %010 | 16-QAM 1/2 RATE | | 16-QAM 1/2 RATE | | 64-QAM 2/3 RATE | | 64-QAM 2/3 RATE | |
| %011 | 64-QAM 1/2 RATE | | 64-QAM 1/2 RATE | | 64-QAM 1/2 RATE | | 64-QAM 1/2 RATE | |
| %100 | 64-QAM 2/3 RATE | | 64-QAM 2/3 RATE | | 64-QAM 2/3 RATE | | 64-QAM 2/3 RATE | |
| %101–%111 | RESERVED FOR FUTURE USE | | | | | | | |

BF MAPPING FOR LCM = %000, COS = %01

FIG. 3B

| BKF VALUE | BASIC BLOCK PACKING STRUCTURE | | | | | | | |
|---|---|---|---|---|---|---|---|---|
| %000 | 4-QAM UNCODED | | | | | | | |
| %001 | 16-QAM UNCODED | | 16-QAM UNCODED | | 16-QAM UNCODED | | 16-QAM UNCODED | |
| %010 | 64-QAM UNCODED | | 64-QAM UNCODED | | 64-QAM UNCODED | | 64-QAM UNCODED | UNUSED |
| %011 | 4-QAM UNCODED | | 16-QAM UNCODED | | 16-QAM UNCODED | | 16-QAM UNCODED | |
| %100–%111 | RESERVED FOR FUTURE USE | | | | | | | |

BF MAPPING FOR LCM = %000, COS = %00

| BKF VALUE | BASIC BLOCK PACKING STRUCTURE | | | | | |
|---|---|---|---|---|---|---|
| %000 | SSCH (4-QAM 1/2 RATE) | UNUSED | | | | |
| %001 | SSCH (4-QAM 1/2 RATE) | 16-QAM 1/2 RATE | | 64-QAM 1/2 RATE | | |
| %010 | SSCH (4-QAM 1/2 RATE) | 64-QAM 1/2 RATE | | 64-QAM 2/3 RATE | 64-QAM UNCODED | 64-QAM 2/3 RATE |
| %011 | SSCH (4-QAM 1/2 RATE) | 64-QAM UNCODED | 64-QAM UNCODED | 64-QAM 2/3 RATE | 64-QAM UNCODED | 64-QAM UNCODED |
| %100 TO %111 | RESERVED FOR FUTURE USE | | | | | |

BF MAPPING FOR LCN = %001, COS = %01

*FIG. 4*

| BKF VALUE | BASIC BLOCK PACKING STRUCTURE | | | |
|---|---|---|---|---|
| %000 | SSCH (4-QAM 1/2 RATE) | UNUSED | 64-QAM 2/3 RATE | 64-QAM 2/3 RATE |
| %001 | SSCH (4-QAM 1/2 RATE) | UNUSED | 16-QAM 1/2 RATE | |
| %010 | SSCH (4-QAM 1/2 RATE) | 64-QAM UNCODED | 64-QAM 1/2 RATE | 64-QAM 1/2 RATE |
| %011 | SSCH (4-QAM 1/2 RATE) | 64-QAM UNCODED | 64-QAM UNCODED | 64-QAM UNCODED |
| %100 TO %111 | RESERVED FOR FUTURE USE | | | |

BF MAPPING FOR LCW = %010, COS = %01

*FIG. 5*

| BKF VALUE | BASIC BLOCK PACKING STRUCTURE | | | |
|---|---|---|---|---|
| %000 | SSCH (4-QAM 1/2 RATE) | 16-QAM 1/2 RATE | | |
| %001 | SSCH (4-QAM 1/2 RATE) | 64-QAM 2/3 RATE | 64-QAM 2/3 RATE | |
| %010 | SSCH (4-QAM 1/2 RATE) | 64-QAM UNCODED | 64-QAM UNCODED | 64-QAM UNCODED |
| %011 TO %111 | RESERVED FOR FUTURE USE | | | |

BF MAPPING FOR LCM = %011, COS = %01

FIG. 6

| BKF VALUE | BASIC BLOCK PACKING STRUCTURE | | |
|---|---|---|---|
| %000 | SSCH (4-QAM 1/2 RATE) | 16-QAM 1/2 RATE | |
| %001 | SSCH (4-QAM 1/2 RATE) | 64-QAM UNCODED | 64-QAM UNCODED |
| %010 TO %111 | RESERVED FOR FUTURE USE | | |

*BF MAPPING FOR LCM = %100, COS = %01*

FIG. 7

| BKF VALUE | BASIC BLOCK PACKING STRUCTURE | |
|---|---|---|
| %000 | SSCH (4-QAM 1/2 RATE) | 64-QAM UNCODED |
| %001 TO %111 | RESERVED FOR FUTURE USE | |

*BF MAPPING FOR LCM = %101, COS = %01*

FIG. 8

| BKF VALUE | BASIC BLOCK PACKING STRUCTURE |
|---|---|
| %000 | SSCH (4-QAM 1/2 RATE) |
| %001 TO %111 | RESERVED FOR FUTURE USE |

BF MAPPING FOR LCN = %110, COS = %01

*FIG. 9*

METHODS OF ADDRESSING AND SIGNALING A PLURALITY OF SUBSCRIBER UNITS IN A SINGLE SLOT

REFERENCE TO RELATED APPLICATION

The present application is related to the following U.S. application Ser. No. 10/166,836, filed Jun. 11, 2002, titled "Method for Assigning Inbound Transmissions with Minimal Signaling Overhead" by Conrad et al., which is commonly owned together with this application by Motorola, Inc.

FIELD OF THE INVENTION

The present invention relates generally to methods of addressing and signaling a plurality of subscriber units in a single slot.

BACKGROUND OF THE INVENTION

The current state of the art employs a dedicated logical control channel, e.g., a dedicated frequency, a dedicated slot used for control, etc. A disadvantage with the current state of the art is that the bandwidth is wasted if no control signaling is in the transmit queue. Another disadvantage of the current state of the art is even if control signaling is in the transmit queue, a base station or subscriber unit could be inundated with very high priority user-payload packets, higher in priority than the control, requiring the entire offered throughput of the channel. If there is a dedicated control channel, as in the current state of the art, this control channel is not typically reallocated for temporary burst of higher priority packets, thus incurring needless delays of high priority user-payload packets. The same is true for control; high priority control signaling may require the entire offered throughput of the channel, preempting user payload traffic.

In addition, when the offered throughput of the channel exceeds the needed throughput of the assigned user currently assigned to the channel, the additional throughput is wasted. In the current state of the art, this additional throughput cannot be reassigned to other users.

Thus, there exists a need for maximizing throughput for control and/or user-payload on a slot-by-slot basis based upon priority.

BRIEF DESCRIPTION OF THE FIGURES

A preferred embodiment of the invention is now described, by way of example only, with reference to the accompanying figures in which:

FIG. 1 illustrates a radio frequency full duplex, time division multiplex system in accordance with the present invention;

FIG. 2 illustrates a total number of basic blocks that can be distributed between the two logical communications path in accordance with the present invention;

FIG. 3A illustrates a packet data channel communications path consisting entirely of six coded user-payload blocks in accordance with the present invention;

FIG. 3B illustrates a packet data channel communications path consisting entirely of six uncoded user-payload blocks in accordance with the present invention;

FIG. 4 illustrates a packet data channel communications path consisting of five user-payload blocks and a signaling channel communications path consisting of one block of control in accordance with the present invention;

FIG. 5 illustrates a packet data channel communications path consisting of four user-payload blocks and a signaling channel communications path consisting of two blocks of control in accordance with the present invention;

FIG. 6 illustrates a packet data channel communications path consisting of three user-payload blocks and a signaling channel communications path consisting of three blocks of control in accordance with the present invention;

FIG. 7 illustrates a packet data channel communications path consisting of two user-payload blocks and a signaling channel communications path consisting of four blocks of control in accordance with the present invention;

FIG. 8 illustrates a packet data channel communications path consisting of one user-payload block and a signaling channel communications path consisting of five blocks of control; and FIG. 9 illustrates a signaling channel communications path consisting of six blocks of control in accordance with the present invention.

DETAILED DESCRIPTION OF THE PREFERRED EMBODIMENT

The present invention maximizes throughput for control and/or user payload on a slot-by-slot basis based upon priority. The present invention removes the constraints of restricting user payload to only available user payload channels as well as removing the constraint of control being transmitted only over dedicated control channels. There are no fixed borders between the user payload and control channels. The present invention decides how to partition the slot based upon what signaling is in the queue and its priority.

The present invention enables a variable size control and user-payload channel within a single slot. This flexibility allows high priority signaling to utilize as much of the throughput available, thus reducing delay. The present invention is especially useful for small packets, such as standalone TCP_ACKS, which can consume much of the available throughput.

FIG. 1 illustrates outbound (downlink) 100 and inbound (uplink) 102 radio frequency ("RF") time division multiplex ("TDM") physical channels. The outbound channel 100 transports information from an infrastructure to a subscriber unit(s); the inbound channel 102 transports information from the subscriber unit(s) to the infrastructure. In the present invention, the infrastructure can be any device or equipment that provides at least the reference system clock (e.g., base station). Each physical channel 100, 102 comprises a stream of slots, wherein each slot 104 is of a fixed duration. Each slot 104 comprises a slot header 106 and at least a logical slot signaling channel ("SSCH") communications path 108 and/or a logical packet data channel ("PDCH") communications path 110. It is important to note that the term "slot header", as used by the present invention, contains control information that allows the slot to be decoded correctly; it should also be noted that the slot header can be placed arbitrarily within the slot (e.g., at the beginning of the slot, at the middle of the slot, at the end of the slot, interleaved through the slot, or the like). Peer-to-peer signaling and control messages are conveyed over the SSCH communications path 108. User plane data (e.g., IP packets) is divided into segments and conveyed over the PDCH communications path 110.

In accordance with the present invention, each slot header 106 for the outbound and inbound channels 100, 102 comprises at least one field. The at least one field preferably comprises a coding scheme, logical channel multiplexing information, and a block format. For ease of explanation and clarification purposes only, the preferred embodiment of the present invention partitions this information into three fields: a coding scheme ("COS") field 112, a logical channel multiplexing ("LCM") field 114, and a block format ("BKF") field 116. The values associated with these fields apply only to the respective slot; in other words, a portion or all of the values associated with these fields may differ from slot-to-slot on any given channel. The COS field 112 specifies the type of forward error correction ("FEC") coding utilized for the data within the SSCH and the PDCH communications paths 108, 110. The LCM field 114 specifies the number of basic blocks (basic blocks are described below in the discussion of FIG. 2) used by the SSCH communications path 108 that exists within the slot 104; in the preferred embodiment of the present invention, any signaling placed within the SSCH communications path 108 occupies the earliest basic block(s), however, it is not limited to such (e.g., the signaling can be placed arbitrarily within the slot). The BKF field 116 specifies the FEC/modulation pairing, and the order of that pairing, of the segments within the slot's PDCH communications path; the BKF field 116 is used in conjunction with the COS field 112 and the LCM field 114.

FIG. 2 illustrates the total number of basic blocks 200, 202, 204, 206, 208, 210 that can be distributed between the two logical communications paths 108, 110 in accordance with the present invention. As shown, the preferred embodiment of the present invention comprises a total number of six basic blocks, however, it is not limited to such. Each basic block comprises a constant number of symbols. The symbols of the basic blocks within a slot may be physically interleaved throughout the slot. The present invention places no limitation as to where an interleaved symbol may be placed within the slot. For example, symbols from basic blocks destined to a first subscriber unit can be interleaved with symbols from basic blocks destined to a second subscriber unit within the same slot; further, since the SSCH and/or PDCH logical communications paths 108, 110 are comprised of basic blocks, PDCH and SSCH symbols may be interleaved throughout the slot. The SSCH and the PDCH communications paths 108, 110 may comprise any number of basic blocks from zero to the total number of basic blocks 200–210 in the slot 104. The sum of the basic blocks 200–210 allocated to the SSCH and/or the PDCH communications paths 108, 110 must equal the total number of basic blocks in the slot 104 (in this example, six).

The basic blocks that are allocated to the SSCH communications path 108 convey the peer-to-peer signaling and/or control messages. Preferably, a separate message header (not shown) precedes each peer-to-peer signaling and/or control message, however, a single message header can precede a group of messages. It is important to note that a plurality of single messages or more than one group of messages may be present within a given SSCH communications path 108. Each message header comprises an address of a subscriber unit ("subscriber address"). The subscriber address in the message header allows peer-to-peer signaling and/or control messages in the SSCH communications path in a single slot to be addressed to one or more subscriber units. Preferably, each message header also comprises an encryption indicator. The encryption indicator indicates whether a particular message is encrypted; as such, some messages within a given slot may be encrypted, while others are not.

In the preferred embodiment of the present invention, the SSCH communications path 108 across the entire outbound/inbound channel 100, 102 is fixed to a constant modulation and FEC rate; however, it is not limited to such (for example, the modulation and FEC rate could vary from slot to slot). It should be noted that the modulation rate, FEC rate, and/or FEC type might differ between SSCH and PDCH communications paths 108, 110 within the same slot 104.

The basic blocks that are allocated to the PDCH communications path 110 convey user-payload partitioned into segments. Each segment has a constant number of bits, some of which are allocated for a segment header. In the preferred embodiment, the number of bits in each segment throughout the entire transmission remains constant, however, it is not limited to such. The segment header also comprises a subscriber address. On the outbound communications path 100, the subscriber address allows each segment to be addressed to a different subscriber unit, if desirable. Preferably, the segment header also comprises an encryption indicator. The encryption indicator indicates whether the particular segment is encrypted; as such, some segments within a given slot may be encrypted, while others are not.

Different types of modulation can be applied to a segment, for example, 4 quadrature amplitude modulation ("QAM"), 16 QAM, 64 QAM, etc. Different types of FEC can also be applied to a segment, for example, 1/2 rate convolutional code, 2/3 rate convolutional code, etc., or none at all. It is important to note that segments within a single slot may be transmitted at different modulation rates, FEC rates and/or have a different FEC type.

As noted above, in the preferred embodiment, the COS field 112 indicates the type of FEC applied within a given slot 104 (e.g., turbo, convolutional, etc.); the LCM field 114 indicates the number of basic blocks appropriated for the SSCH communications path 108; and the BKF field 116 indicates the number of segments within the PDCH communications path 110, the modulation type of each segment, the FEC rate of each segment, the position of the SSCH communications path 108 with respect to the PDCH communications path 110, and the order of the segments within the PDCH communications path 110. A value is assigned to each of these fields on a slot-by-slot basis. With that being said, let us now turn our attention to particular examples of the present invention.

FIG. 3A illustrates a PDCH communications path 110 consisting entirely of six coded user-payload blocks 200–210 in accordance with the present invention. For example, in FIG. 3A, the value of the LCM field 114 is %000 which indicates that there is no SSCH communications path 108 present in the given slot 104. As shown, when the value of the BKF field 116 is %010 and the value of the COS is %01, three segments 300, 302, 304 are present in the PDCH communications path 110; one segment 300 is modulated at 16-QAM and FEC encoded at 1/2 rate, each of the other two segments 302, 304 are modulated at 64-QAM and FEC encoded at 2/3 rate. In this example, the 16-QAM modulated segment 300 precedes the two 64-QAM modulated segments 302, 304. However, when the value of the BKF field is %000, one segment 306 is present in the PDCH communications path 110 modulated at 4-QAM and FEC encoded at 1/2 rate; alternatively, when the BKF field is %100, four segments 308, 310, 312, 314 are present in the PDCH communications path 110, each modulated at 64-QAM and FEC encoded at 2/3 rates. As stated above, it is important to note that each segment in the PDCH communications path 108 comprises a segment header that allows the opportunity for each segment in a single slot to be addressed to a different subscriber unit; for example, the first segment 300 could be addressed to subscriber unit A, the second segment 302 could be addressed to subscriber unit B, and the third segment 304 could be addressed to subscriber unit C.

FIG. 3B illustrates a similar example as shown in FIG. 3A with the six user-payload blocks 200–210 being uncoded. FIGS. 4, 5, 6, 7, and 8 illustrate similar examples as shown in FIG. 3A with varying numbers of basic blocks appropriated for the SSCH communications path 108 and the PDCH communications path 110. For example, as shown in FIG. 4, the value of the LCM field 114 is %001 which indicates that the SSCH communications path 108 is present and occupies one basic block 200. As stated above, the SSCH communications path 108 comprises at least one message. It is important to note each message or a group of messages comprise a message header that allows the opportunity for each message, or group of messages, to be addressed to a different subscriber in a single slot.

The same logic applies to the remaining examples illustrates in FIGS. 3A–9 where the SSCH communications path 108 occupies two basic blocks 200, 202 and the PDCH communications path 110 occupies four basic blocks 204, 206, 208, 210 in FIG. 5; the SSCH communications path 108 occupies three basic blocks 200, 202, 204 and the PDCH communications path 110 occupies three basic blocks 206, 208, 210 in FIG. 6; the SSCH communications path 108 occupies four basic blocks 200, 202, 204, 206 and the PDCH communications path 110 occupies two basic blocks 208, 210, in FIG. 7; the SSCH communications path 108 occupies five basic blocks 200, 202, 204, 206, 208 and the PDCH communications path 110 occupies one basic block 210 in FIG. 8; and the SSCH communications path 108 occupies six basic blocks 200, 202, 204, 206, 208, 210 and the PDCH communications path 110 is not present in FIG. 9. Through these examples, it is important to note that the sum of the total number of basic blocks allocated to both the SSCH and PDCH communications paths equals the total number of basic blocks in the slot 104. Thus, the present invention allows the allocation of basic blocks to a communications path to vary based upon the signaling in the queue and its priority.

It should also be noted that in the preferred embodiment, the present invention utilizes a storage medium having stored thereon a set of instructions which, when loaded into a microprocessor, causes the microprocessor to perform the details of the present invention as described above. It should be obvious to those skilled in the art, however, that the present invention may be implemented in hardware or software.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a system having at least a first slot, a method comprising the step of:
   configuring the first slot into at least a first segment and a second segment, wherein the first slot comprises a fixed number of symbols;
   appropriating a first set of symbols to the first segment; and
   appropriating a second set of symbols to the second segment, wherein the sum of at least the first set of symbols and the second set of symbols equals the fixed number of symbols,
   wherein the first segment is addressed to a first subscriber unit and the second segment is addressed to a second subscriber unit, and
   wherein the first segment is modulated at a first modulation rate and the second segment is modulated at a second modulation rate.

2. The method of claim 1 wherein the first segment and the second segment each comprises at least one symbol, and wherein the at least one symbol from the first segment and the at least one symbol from the second segment are interleaved.

3. The method of claim 1 wherein the first segment has a first segment header and the second segment has a second segment header.

4. The method of claim 1 wherein at least one field in the first slot is selected from a group consisting of: a coding scheme field, a logical channel multiplexing field, a block format field, and a combined field.

5. The method of claim 1 wherein at least a portion of the data within at least one of the first segment and the second segment is encrypted.

6. The method of claim 1 further comprising the step of:
   configuring a second slot into at least one of the following: at least one segment, and at least one signaling message.

7. The method of claim 1 wherein the first modulation rate for the first segment is different from the second modulation rate for the second segment.

8. The method of claim 1 wherein the first modulation rate for the first segment and the second modulation rate for the second segment are the same.

9. The method of claim 1 wherein the first segment and the second segment comprise a forward error correction type, and wherein the forward error correction type of the first segment is different from the forward error correction type of the second segment.

10. The method of claim 1 wherein the first segment and the second segment comprise a forward error correction type, and wherein the forward error correction type of the first segment and the forward error correction type of the second segment are the same.

11. The method of claim 1 wherein the first segment and the second segment have a common number of bits.

12. The method of claim 1 wherein the first segment and the second segment have a different number of bits.

13. The method of claim 1 wherein at least one of the steps is implemented in hardware.

14. The method of claim 1 wherein at least one of the steps is implemented in software.

15. The method of claim 1 wherein the stops are a set of instructions that is stored in a storage medium which, when loaded into a microprocessor, cause the microprocessor to perform at least the portion of the steps.

16. In a system having at least a first slot, a method comprising the step of:
   configuring the first slot into at least one of a signaling communications path and a packet data communication path, wherein the first slot comprises a fixed number of symbols,
   appropriating a first set of symbols to the signaling communication path; and
   appropriating a second set of symbols to the packet data communication path,
   wherein the sum of the first set of symbols and the second set of symbols equals the fixed number of symbols, wherein the packet data communications path comprises a plurality of segments, wherein at least a first segment is addressed to a first subscriber unit and at least a second segment is addressed to a second subscriber unit, and wherein the first segment is modulated at a first modulation rate and the second segment is modulated at a second modulation rate.

17. The method of claim 16 further comprising the steps of:

appropriating a number of symbols associated with the signaling communications path in the first slot; and appropriating a dissimilar number of symbols associated with the signaling communications path in the second slot.

18. The method of claim 16 wherein at least one of the steps is a set of instructions that is stored in a storage medium which, when loaded into a microprocessor, cause the microprocessor to perform at least the portion of the steps.

19. The method of claim 16 wherein at least one segment in the plurality of segments is encrypted.

20. The method of claim 16 wherein each segment in the plurality of segments has a message header.

21. The method of claim 16 wherein the plurality of segments is divided into at least one set of segments comprising at least one segment, and wherein each set of segments has a message header.

22. The method of claim 16 wherein the signaling communications path and the packet data communications path each comprises at least one symbol, and wherein the at least one symbol from the packet data communications path and the at least one symbol from the signaling communications path are interleaved.

23. The method of claim 16 wherein the first segment and the second segment each comprises at least one symbols, and the at least one symbol from the first segment and the at least one symbol from the second segment are interleaved.

24. In a system having at least a first slot, a method comprising the steps of:

configuring the first slot into at least one of a signaling communications path and packet data communications path, wherein the first slot comprises a fixed number of symbols;

appropriating a first set of symbols to the signaling communications path; and appropriating a second set of symbols to the packet data communications path, wherein the sum of the first set of symbols and the second set of symbols equals the fixed number of symbols, wherein the signaling communications path comprises a plurality of messages, wherein at least a first message is addressed to a first subscriber unit and at least a second message is addressed to a second subscriber unit, and wherein the first message is modulated at a first modulation rate and the second message is modulated at a second modulation rate.

25. The method of claim 24 wherein at least one message in the plurality of messages is encrypted.

26. The method of claim 24 wherein each message in the plurality messages has a message header.

27. The method of claim 24 wherein the plurality of messages is divided into at least one set of messages comprising at least one message, and wherein each set of messages has a message header.

28. The method of claim 24 wherein the signaling communications path and the packet data communications path each comprises at least one symbol, and wherein the at least one symbol from the packet data communications path and the at least one symbol from the signaling communications path are interleaved.

29. The method of claim 24 wherein the first message and the second message each comprises at least one symbols, and wherein the at least one symbol from the first message and the at least one symbol from the second message are interleaved.

30. The method of claim 24 further comprising the steps of:

appropriating a number of symbols associated with the signaling communications path in the first slot; and appropriating a dissimilar number of symbols associated with the signaling communications path in the second slot.

* * * * *

UNITED STATES PATENT AND TRADEMARK OFFICE
CERTIFICATE OF CORRECTION

PATENT NO. : 6,928,065 B2
DATED : August 9, 2005
INVENTOR(S) : Logalbo et al.

It is certified that error appears in the above-identified patent and that said Letters Patent is hereby corrected as shown below:

Column 5,
Line 60, change "step" to -- steps --.

Column 6,
Line 52, change "stops" to -- steps --.

Column 7,
Line 37, change "symbols" to -- symbol --.
Line 38, change "and" to -- and wherein --.

Signed and Sealed this

Thirtieth Day of May, 2006

JON W. DUDAS
*Director of the United States Patent and Trademark Office*